United States Patent
Werner et al.

(10) Patent No.: US 10,462,718 B2
(45) Date of Patent: Oct. 29, 2019

(54) METHOD AND ARRANGEMENTS FOR HANDLING AN INTRA FREQUENCY SAI LIST

(71) Applicant: Telefonaktiebolaget L M Ericsson (publ), Stockholm (SE)

(72) Inventors: Peter Werner, Linköping (SE); Björn Knuthammar, Linköping (SE); Joakim Leuhusen, Sturefors (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 471 days.

(21) Appl. No.: 14/895,783

(22) PCT Filed: Aug. 18, 2014

(86) PCT No.: PCT/SE2014/050944
§ 371 (c)(1),
(2) Date: Dec. 3, 2015

(87) PCT Pub. No.: WO2015/026283
PCT Pub. Date: Feb. 26, 2015

(65) Prior Publication Data
US 2016/0135099 A1     May 12, 2016

Related U.S. Application Data

(60) Provisional application No. 61/867,292, filed on Aug. 19, 2013.

(51) Int. Cl.
*H04W 36/00* (2009.01)
*H04W 4/06* (2009.01)
(Continued)

(52) U.S. Cl.
CPC ......... *H04W 36/0083* (2013.01); *H04W 4/06* (2013.01); *H04W 72/0453* (2013.01); *H04L 12/189* (2013.01)

(58) Field of Classification Search
CPC ..... H04W 4/06; H04W 76/002; H04W 48/18; H04W 36/0061; H04W 36/06; H04W 48/10
See application file for complete search history.

(56) References Cited

U.S. PATENT DOCUMENTS

| | | |
|---|---|---|
| 2013/0039250 A1 | 2/2013 | Hsu |
| 2013/0195003 A1 | 8/2013 | Lee et al. |
| 2014/0036755 A1* | 2/2014 | Lee ........................ H04W 36/26 370/312 |

OTHER PUBLICATIONS

International Search Report and Written Opinion of the International Searching Authority, Application No. PCT/SE2014/050944, dated Dec. 12, 2014.
(Continued)

*Primary Examiner* — Romani Ohri
(74) *Attorney, Agent, or Firm* — Sage Patent Group

(57) ABSTRACT

A method for allowing a user equipment to determine whether Service Area Identities (SAIs) of a list of SAIs are current SAIs or neighboring SAIs by: receiving a list of SAIs from a network node, where the list is indicative of Service Areas capable of providing the broadcasted service to the user equipment and comprise at least one current SAI and at least one neighboring SAI; identifying, in the list, the SAIs as arranged into two distinguishable groups, where a first group comprise the at least one current SAI and a second group comprise the at least one neighboring SAI, and distinguishing, based on the arrangement of the list, current SAIs from neighboring SAIs. A method is also disclosed for arranging a SAI list into the two distinguishable groups by a network node.

9 Claims, 8 Drawing Sheets

(51) Int. Cl.
  *H04W 72/04*   (2009.01)
  *H04L 12/18*   (2006.01)

(56)        References Cited

OTHER PUBLICATIONS

3GPP, Technical Specification, "3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.9.0 (Sep. 2014),356 pp.

* cited by examiner

```
-ASN1START
SystemInformationBlockType15-r11::=SEQUENCE {
    Sai-IntraFreq-r11              MBMS-SAI-List-r11
        OPTIONAL, --Need OR
    sai-IntraFreq-r11   MBMS-SAI-InterFreqList-r11        OPTIONAL, -
    -Need OR
        lateNonCriticalExtension       OCTET STRING       OPTIONAL, -
    -Need OR
        ...
}

MBMS-SAI-List-r11 ::=    SEQUENCE (SIZE (1..maxSAI-MBMS-R11)) OF
MBMS-SAI-r11

MBMS-SAI-r11             INTEGER (0..65535)
    MBMS-SAI-InterFreq-r11 ::=    SEQUENCE {

MBMS-SAI-InterFreqList-r11 ::=   SEQUENCE (SIZE (1..maxFreq)) OF MBMS-
SAI-InterFreq-r11

Dl-CarrierFreq           ARFCN-ValueEUTRA,
    SAI-List-r11             MBMS-SAI-List-r11
        ...
}
```

Fig. 3 (Prior art)

METHOD AND ARRANGEMENTS FOR HANDLING AN INTRA FREQUENCY SAI LIST

CROSS REFERENCE TO RELATED APPLICATIONS

This application is a 35 U.S.C. § 371 national stage application of PCT International Application No. PCT/SE2014/050944, filed on Aug. 18, 2014, which itself claims priority to U.S. provisional patent Application No. 61/867,292, filed Aug. 19, 2013, the disclosure and content of both of which are incorporated by reference herein in their entireties. The above-referenced PCT International Application was published in the English language as International Publication No. WO 2015/026283 A1 on Feb. 26, 2015.

TECHNICAL FIELD

The present document relates to methods for enhancing and handling an enhanced SAI list, as well as a network node and a User Equipment for executing such a method.

BACKGROUND

LTE (Long-Term Evolution) is a standard wireless communication of high-speed data for mobile phones and data terminals, which is a natural upgrade for carriers with both GSM/UMTS networks and CDMA200 networks.

A simplified architecture of a Long Term Evolution (LTE) system can be illustrated as shown in FIG. 1. In LTE the downlink is based on orthogonal frequency division multiplexing (OFDM) while the uplink is based on a single carrier modulation method known as discrete Fourier transform spread OFDM (DFT-S-OFDM).

The communications network 100 illustrated in FIG. 1, comprises an air interface applied for LTE, referred to as Evolved Universal Terrestrial Radio Access (E-UTRAN) and is here made up of three eNB nodes, 110a, 110b, 110c, which are connected to each other via the X2 interface (solid lines), and connected to two Mobility Management Entities (MME), or Serving Gateways (S-GW), 120a, 120b via the S1 interface (dashed lines). Both the S1 and the X2 interface can be divided into control plane and user plane parts.

LTE Broadcast is a point-to-multipoint service, which may be applicable in LTE systems, in which data is transmitted from a single source entity to multiple recipients. This service is based on enhanced Multimedia Broadcast Multicast Services (eMBMS), which was included in the 3GPP release 9 specifications and which is evolved from MBMS. For an overall description of E-UTRAN eMBMS functionality, see 3GPP TS 36.300.

On the eUTRAN-UE (Uu) interface, the MBMS Single Frequency Network (MBSFN) transmission mode applies. This is characterized by synchronous transmission of the same signal from all cells within a MBSFN area, which enables User Equipments (UEs) to connect to the network to combine eMBMS transmission from multiple cells. Transmitting the same data to multiple recipients allows network resources to be shared.

The eMBMS is realized in the 3GPP specifications by the addition of a number of new capabilities to existing functional entities of the 3GPP architecture, as well as the addition of a new functional entity. It is to be understood that throughout this document MBMS is to be referred to as both MBMS and eMBMS, in case not explicitly indicated otherwise.

eMBMS was introduced in LTE Rel-9 to allow for efficient transmission of the same content from a content provider to many UEs.

When broadcasting eMBMS via LTE Broadcast on one or multiple Carriers in a deployment scenario with overlapping carriers the following requirements were defined in 3GPP:
Network Related Behavior:

Support of mobility procedures such that an interested UE is moved to a correct frequency to start MBMS service reception kept on the correct frequency to start/continue MBMS service reception. An applicable service layer and network then provide the UE with LTE broadcast reception.
UE Related Behavior:

A UE in IDLE mode can perform autonomous frequency prioritization while a UE in CONNECTED mode informs the network about its interest (MBMS frequency).

In order to enable use of MBMS or eMBMS, MBMS assistance information is made available to UEs. A User Service Description (USD) applied in the service layer, provides UEs with MBMS frequency, session start and time as well as information about the usability of an available MBMS service, which is identified by the Temporary Mobile Group Identities (MBMS SAIs).

System Information Blocks (SIBs) comprise system information that is transmitted from UTRAN, here E-UTRAN, to UEs. SystemInformationBlockType15, from hereinafter referred to as SIB 15 or SIB type 15, is a new SIB, described in 3GPPTS 36.331 "Radio Resource Control (RRC) Protocol Specification" (Release 11), which is broadcasted by the E-UTRAN to the UEs where all cells provide MBMS Service Area Identities (SAIs) for a current frequency and neighboring frequencies from where MBMS is provided. Based on the USD and SIB15, a UE will know when its MBMS service can be provided and on which frequency it can be provided. An example of such information, which can be referred to as MBMS assistance information, is illustrated in FIG. 2.

In FIG. 2 a combination of service layer information, as mentioned above, and information from RAN, comprise a User Service Description (USD) 210 in the service layer. The USD 210 provides information on the availability of MBMS service, which is identified by a Temporary Mobile Group Identity (TMGI) and comprise MBMS Service Area Identities (MBMS SAIs) here represented by SAI41, SAI42 and SAI43), MBMS frequencies (f2, f3), as well as start time (Start) and end time (End) of a respective service. In addition, the new SIB, SIB15, which is broadcasted from all cells of the RAN comprise respective MBMS SAIs for the current frequencies (current SAIs), as well as for the neighboring frequencies (neighboring SAIs). Based on the relevant USD and the SIB15 the UE 220 will be made aware of when its MBMS service is provided and on which frequency. In the present example f1 is a frequency used for unicast, while f2 is used for MBMS transmission.
Summary of Functionality Requested by 3GPP:

Below, a summary of functionality requested by 3GPP, described in 3GPPTS 36.331 "Radio Resource Control (RRC) Protocol Specification" (Release 11) is given.

1. The access node, here represented by an eNB, shall support MBMS Service Acquisition by notifying all UEs about the availability of specific MBMS service areas per carrier. In the present example this is executed by providing this information in SIB15, but in an alternative system or network the corresponding information may be provided in any other type of message, capable of providing or carrying such information to UEs.

2. The eNB react upon the UE's indicated MBMS Service preferences by means of Inter-Frequency HO. The UE is capable of indicating the MBMS interest, via which the MBMS service preferences can be reached with the RRC MBMS INTEREST INDICATION.
3. This eNB shall also ensure MBMS Service continuity by preventing Inter-Frequency HO due to load balancing.

Focusing on step 1) mentioned above, the specific SIB, denoted as the IE SIB Type15, contains the MBMS SAIs of both the current and/or neighboring carrier frequencies, as indicated in FIG. 3, where element "sai-IntraFreq" contains a list of MBMS SAIs broadcasted in the current frequency; "sai-InterFreqList' contains a list of neighboring frequencies on which one or more MBMS services are broadcasted and the corresponding MBMS SAIs, while "sai-List" contains a list of MBMS SAIs for a specific frequency.

SUMMARY

Briefly described, the present document relates to methods for enhancing and handling an enhance SAI list, as well as a network node and a User Equipment (UE) for executing such a method.

According to one aspect a method executed in a network node of a communication network, capable of transmitting a broadcasted service to UEs, is provided. A list of Service Area Identities (SAIs), indicative of Service Areas capable of providing the broadcasted service to the UEs, is acquired, where the list comprise at least one current SAI and at least one neighboring SAI. The list is modified by grouping the SAIs, such that the at least one current SAI is distinguishable from the at least one neighboring SAI, after which the modified list is transmitted to the UEs.

An advantage of making such a grouping is that the UE will be made aware of which SAIs are current SAIs and which are neighboring SAIs, simply by receiving the SAI list, i.e. without requiring any further information.

More specifically, the modification may comprise grouping of the SAIs into a first group of successively listed SAIs, representing current SAIs, and a second group of successively listed SAIs, representing neighboring SAIs, or vice versa, where the two listings are separated by a generated delimiter symbol.

According to one embodiment, the delimiter symbol is generated by duplicating the value of the last SAI of the first group, while according to another embodiment the delimiter symbol is instead generated by applying a predefined symbol, dedicated for indicating separation of the two groups.

The list may be contained in a SIB, such as e.g. a SIB Type 15.

According to another embodiment a network node of a communication network capable of transmitting a broadcasted service to UEs is provided. Such a network node comprise a processor, and a memory, storing instructions which, when executed by the processor cause the network node (600a) to: acquire a list of SAIs, indicative of service areas capable of providing the broadcasted service to the UEs, the list comprising at least one current SAI and at least one neighboring SAI; modify the list by grouping the SAIs, such that the at least one current SAI is distinguishable from the at least one neighboring SAI, and transmit the modified list to the UEs.

The instructions to modify the list may comprise instructions which, when executed by the processor causes the processor to group the SAIs into a first group of successively listed SAIs, representing current SAIs, and a second group of successively listed SAIs, representing neighboring SAIs, or vice versa, where the two listings are separated by a generated delimiter symbol.

According to one embodiment, the instructions to modify the list comprise instructions which, when executed by the processor causes the processor to generate a delimiter symbol by duplicating the value of the last SAI of the first group, while according to another embodiment the instructions to modify the list comprise instructions which, when executed by the processor causes the processor to generate a delimiter symbol by applying a predefined symbol, dedicated for indicating separation of the two groups.

According to another aspect a network node of a communication network, capable of transmitting a broadcasted service to UEs, can be provided, where the network node comprise a plurality of interacting units, here represented by: a SAI list unit for acquiring a list of Service Area Identities (SAIs), indicative of Service Areas capable of providing the broadcasted service to the UEs, where the list comprise at least one current SAI and at least one neighboring SAI; a modifying unit for modifying the list by grouping the SAIs, such that the at least one current SAI is distinguishable from the at least one neighboring SAI, and a transmitting unit for transmitting the modified list to the UEs.

Typically the network node is an access node of the communication network, such as e.g. an eNB.

According to yet another aspect a computer program executable on a network node capable of transmitting a broadcasted service to UEs is provided. The computer program comprises computer program code which, when run on the network node causes the network node to: acquire a list of SAIs, indicative of service areas capable of providing the broadcasted service to the UEs, the list comprising at least one current SAI and at least one neighboring SAI; modify the list by grouping the SAIs, such that the at least one current SAI is distinguishable from the at least one neighboring SAI, and transmit the modified list to the UEs.

According to another aspect a computer program product is disclosed which comprises a computer program, such as the one mentioned above, and a computer readable means on which the computer program is stored.

According to another aspect a method executed in a UE, capable of receiving a broadcasted service from a communication system, is suggested, where such a method comprise: receiving a list of SAIs from a network node, the list being indicative of service areas capable of providing the broadcasted service to the UE, the list comprising at least one current SAI and at least one neighboring SAI; identifying, in the list, the SAIs as arranged into two distinguishable groups, wherein a first group comprise the at least one current SAI and a second group comprise the at least one neighboring SAI, and distinguishing, based on the arrangement of the list, current SAIs from neighboring SAIs.

The identifying may comprise identifying a delimiter symbol among the listed SAIs, where the delimiter symbol is arranged such that it is separating the two groups from each other.

According to one embodiment, the delimiter symbol is identified by recognizing a duplication of a SAI value among the listed SAIs, while according to another embodiment the delimiter symbol is identified by recognizing a predefined symbol, dedicated for indicating separation of the two groups.

According to yet another aspect a UE capable of receiving a broadcasted service from a communication system is provided. The UE comprise a processor and a memory storing instructions which, when executed by the processor cause the UE to: receive a list of SAIs from a network node, the list being indicative of service areas capable of providing the broadcasted service to the UE, the list comprising at least one current SAI and at least one neighboring SAI; identify, in the list, the SAIs as arranged into two distinguishable groups, wherein a first group comprise the at least one current SAI and a second group comprise the at least one neighboring SAI, and distinguish, based on the arrangement of the list, current SAIs from neighboring SAIs.

More specifically, the instructions to identify the SAIs into two distinguishable groups comprise instructions which, when executed by the processor, causes the processor to identify, among the listed SAIs, a delimiter symbol, separating the two groups from each other.

According to one embodiment the instructions to identify the SAIs into two distinguishable groups comprise instructions which, when executed by the processor, causes the processor to identify the delimiter symbol by recognizing a duplication of a SAI value among the listed SAIs.

According to another embodiment the instructions to identify the SAIs into two distinguishable groups comprise instructions which, when executed by the processor, causes the processor to identify the delimiter symbol by recognizing a predefined symbol, dedicated for indicating separation of the two groups.

According to another aspect a UE capable of receiving a broadcasted service from a communication system, is provided which comprise: means (740b) for receiving a list of SAIs from a network node, the list being indicative of service areas capable of providing the broadcasted service to the UE, the list comprising at least one current SAI and at least one neighboring SAI; means (710b) for identifying, in the list, the SAIs as arranged into two distinguishable groups, wherein a first group comprise the at least one current SAI and a second group comprise the at least one neighboring SAI, and means for distinguishing, based on the arrangement of the list, current SAIs from neighboring SAIs.

According to another aspect a computer program executable on a UE, capable of receiving a broadcasted service from a communication system, is provided, the computer program comprising computer program code which, when run on the UE causes the UE to: receive a list of SAIs from a network node, the list being indicative of service areas capable of providing the broadcasted service to the UE, the list comprising at least one current SAI and at least one neighboring SAI; identify, in the list, the SAIs as arranged into two distinguishable groups, wherein a first group comprise the at least one current SAI and a second group comprise the at least one neighboring SAI, and distinguish, based on the arrangement of the list, current SAIs from neighboring SAIs.

According to yet another aspect a computer program product comprising a computer program as suggested above and a computer readable means on which the computer program is stored is provided.

BRIEF DESCRIPTION OF DRAWINGS

Embodiments will now be described in more detail in relation to the accompanying drawings, in which:

FIG. 3 is an illustration of how a SAI list can be arranged according to the prior art.

DETAILED DESCRIPTION

Figure 1:
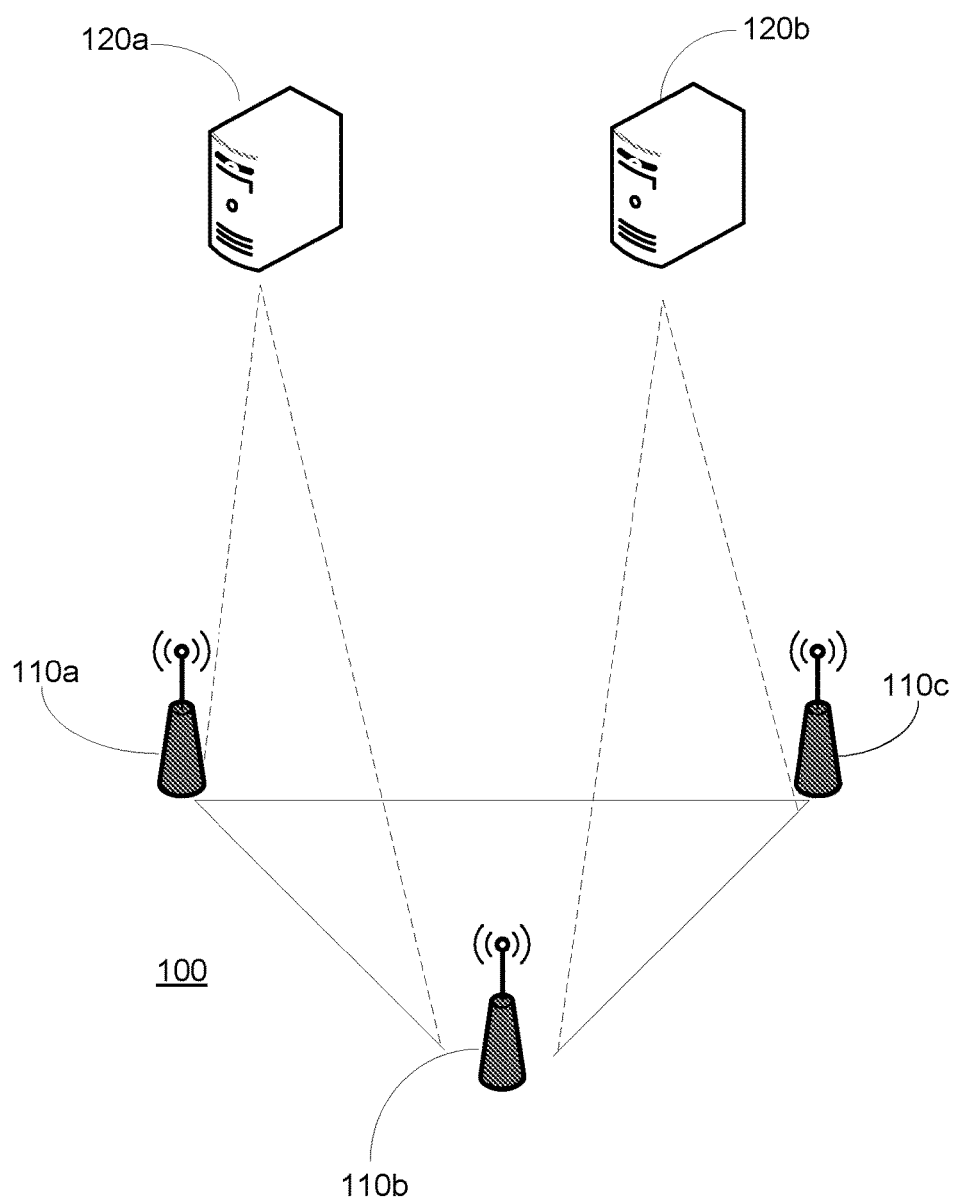
FIG. 1 is a system overview, according to the prior art.
Figure 2:
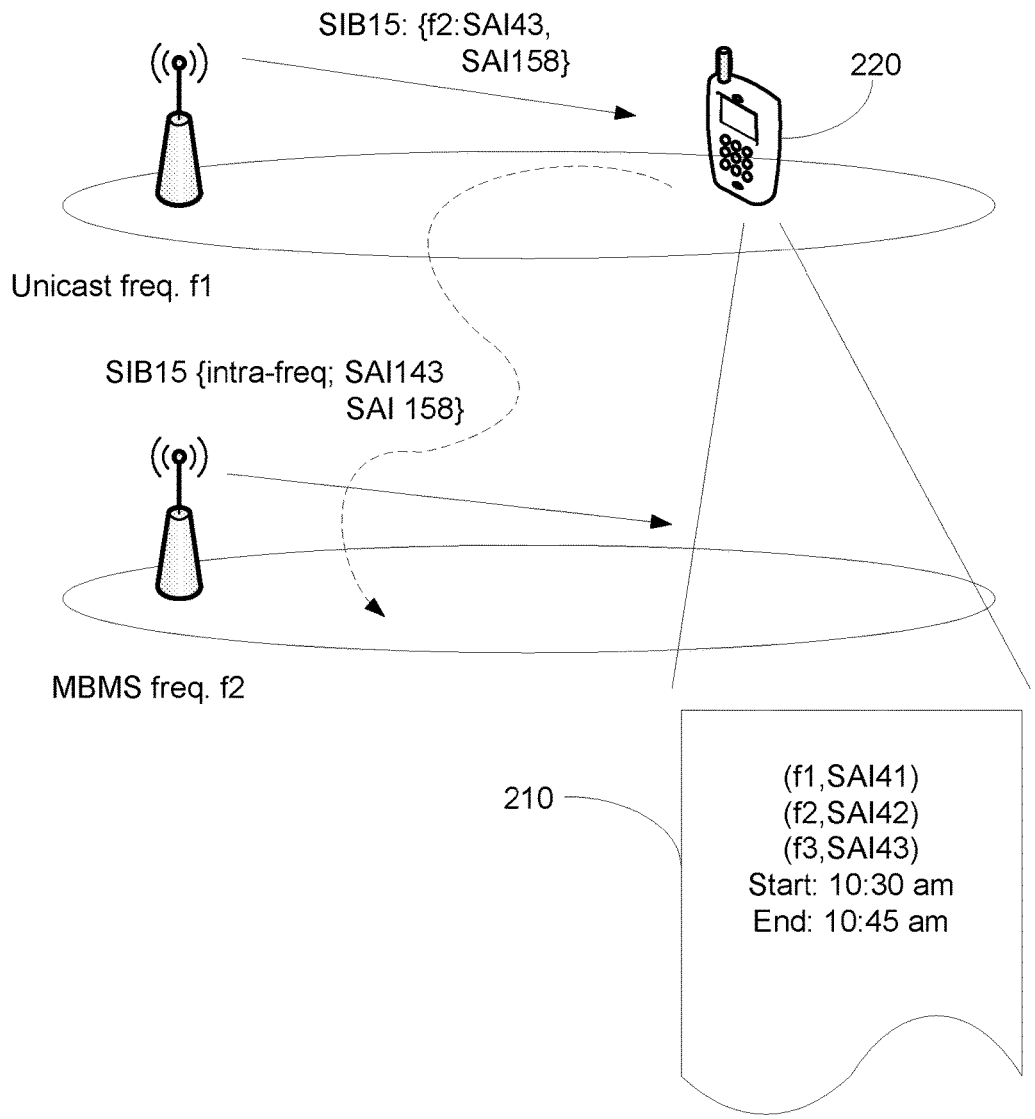
FIG. 2 is an illustration of how SAIs are used according to the prior art.

There might be situations where the UE want to know if a certain SAI is covered in the current cell, e.g. to inform an application about the availability of certain MBMS Services in the current location, rather than only knowing all SAIs, including both SAIs of current, as well as neighboring cells, which can provide a required MBMS service.

This document suggests a method which allows a UE capable of receiving a broadcasted service from a communication system, and thus also information on which SAIs that can provide such a service, to distinguish or discriminate between SAIs provided from a network node of the communication system to the UE in a list of SAIs, from hereinafter referred to as a SAI list, SAIs broadcasted in the current cell, i.e. presently used for broadcasting the mentioned service, from hereinafter referred to as current SAIs, and SAIs that are broadcasted in neighbor cells that have the same frequency as the current cell, the latter SAIs from hereinafter referred to as neighboring SAIs. By applying the suggested method, a UE will be able to make the mentioned distinction only from interpreting data provided in an enhanced SAI list.

A method is therefore suggested where, by a convention of structuring, a UE is capable of receiving a list of SAIs transmitted from a network node and to implicitly discriminate and distinguish the received information about the SAIs in current Cells, i.e. current SAIs, from SAIs in neighbour cells, i.e. neighboring SAIs.

It is therefore suggested that, prior to distribution from the network, the SAI list, such as e.g. a sai-InterFreq list, contained in a SIB type 15, or any other suitable message format, is modified in such a way that a UE will be able to identify which of the given SAIs that identify current cells and which SAIs that identify neighboring cells.

According to one embodiment, the applied SAI list is modified by way of implementing a double value into the SAI list, at a network node, where the inserted double value is serving as a delimiter symbol. SAIs 5, 10, 15 and 20 may e.g. provide a certain MBMS service, where SAIs 10 and 20 represent current SAIs, while SAIs 5 and 15 represent neighboring SAIs. In the given example the list may be modified, such that after the modification the list reads {10, 20 20, 5, 15}, where the current SAI having the highest number, here 20, has been duplicated, thereby clearly distinguishing the current SAIs from the subsequent neighboring ones. However, any of the SAIs given in any of the two groups, may be duplicated, thereby becoming a delimiter symbol which can easily be identified as such by a UE, and thus distinguishing the two mentioned groups of SAIs from each other.

According to another embodiment, distinguishing SAIs in a SAI list can be achieved by instead reserving, at a network node, one specific, dedicated symbol which has been reserved for the purpose of servicing as a delimiter symbol. If using the same example as above, where again SAIs 10 and 20 represent current SAIs, while SAIs 5 and 15 represent neighboring SAIs and where the delimiter symbol used is "0", the sequence {10,20,0,5,15} of the SAI list will clearly distinguish the current SAIs from the neighboring SAIs, since "0" is presently not used for indicating any specific SAI. It is however to be understood that the use of delimiter symbol "0" is merely given as one possible example, and that any delimiter symbol which is not representing a certain SAI used in the respective communication network can be specified as instead representing a distinguishing delimiter symbol, as described herein, which can be used to unambiguously distinguishing the two different groups of SAIs from each other, as described herein.

Even though the SAI list described in the examples given above is a "sai-InterFreq list", it is to be understood that any type of list distributed from a network node to a UE may be modified in a corresponding way, as long as the UE is capable of distinguishing the used delimiter symbol from a SAI in the list By applying the suggested method, the geographic SAI information as described above will be more precise, thereby allowing a UE receiving this information to get additional information about MBMS Service availability prior to the actual MBMS Broadcast. Furthermore, by applying the suggested method, the receiving UE can avoid unnecessary frequency changes if the received SAI information is more precise and informative already upon reception.

Furthermore, the suggested method does not change the existing "saiList" format and can therefore be easily adopted since the information is transferred as a new convention. Thereby, once the network node has been adapted to modify the list accordingly, the UEs merely need to be able to interpret the information added to the "saiList" by the network node, to be able to distinguish the information provided in the list.

Figure 4:
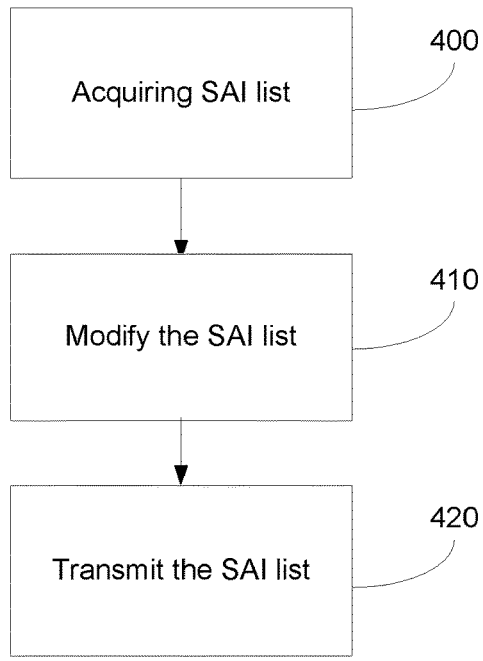
FIG. 4 is an illustration of a method executed in a network node according to one embodiment.

A method to be executed in a network node of a communication network, capable of providing a broadcasted service to a UE, can therefore be provided, as illustrated in FIG. 4, wherein the method comprise:

Acquiring a list of SAIs, indicative of service areas capable of providing the broadcasted service, the list comprising at least one current SAI and at least one neighboring SAI, as indicated in a step 400.

Modifying the list by grouping the SAIs, such that the current SAIs are made distinguishable from the neighboring SAIs by the UE, as indicated in another step 410.

Transmitting the modified list to the UE, as indicating in a subsequent step 420.

More specifically, the grouping can be achieved by inserting a delimiter symbol, such that the at least one current SAI is separated and distinguishable from the at least one neighboring SAI, and that such a separating is made in a pre-defined order.

According to one embodiment, the delimiter symbol is a duplication of one of the SAIs belonging to the respective group of SAIs, initially mentioned in the list, such as e.g. the SAI last mentioned of the respective first group of SAIs.

According to another embodiment the delimiter symbol is a symbol, specifically dedicated as a delimiter symbol, where the symbol can be selected from symbols not used for representing any specific SAI from which the broadcasted service can be provided.

According to one embodiment, the SAI list may be provided as a sai-IntraFreq list and such a list may e.g. be contained in a SIB Type 15, but alternatively, the list may be provided in any format where the mentioned SAIs can be identified as comprising any of the two mentioned groups.

The suggested methods can be applied in a communication network capable of broadcasting via MBMS or eMBMS, or any other network where a SAI list is used.

Figure 5:
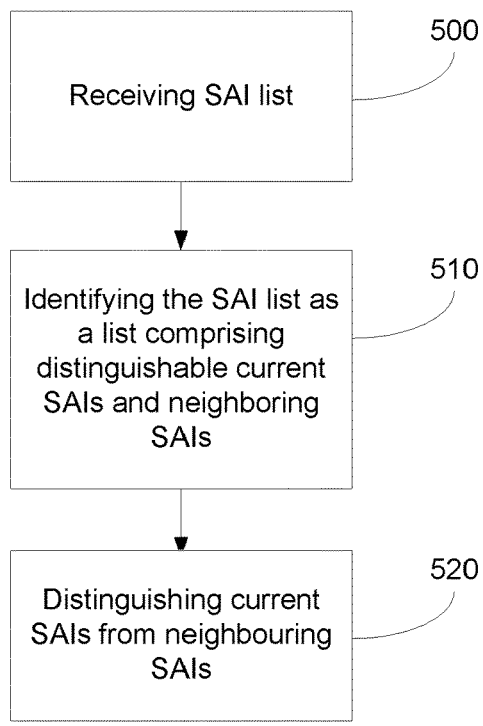
FIG. 5 is an illustration of a method executed in a UE according to one embodiment.

A corresponding method executed in a UE, capable of receiving a broadcasted service, where a SAI list has been prepared as suggested above, can be provided as illustrated in FIG. 5, wherein the method comprise:

Receiving a list of SAIs, indicative of service areas capable of providing the broadcasted service, from a network node, typically an eNB, or any other applicable access node, the list comprising at least one current SAI and at least one neighboring SAI, as indicated in a step 500.

Identifying the list as a list comprising current SAIs and neighboring SAIs which are arranged in such a way that they can be directly distinguishable from each other by the UE receiving the list, as indicated in another step 510. One way of achieving this is by applying a symbol other than the symbols, representing a current SAI or a neighboring SAI, as a delimiter symbol, and distinguishing, based on the arrangement of the list, e.g. by identifying a delimiter symbol, the at least one current SAI from the at least one neighboring SAI.

As a prerequisite, it is assumed that the UE is made aware of which delimiter symbol to interpret as such in advance. Thereby, the UE will immediately recognize a delimiter symbol if such a symbol is present in a SAI list, and, as a consequence, the UE can directly upon reception of the list use this information to distinguish current SAIs from neighboring SAIs, without having to receive information other than the SAI list.

The method may either comprise identifying a duplicated SAI in the first group of SAIs as a delimiter symbol, or identifying a delimiter symbol, specifically dedicated for being used for delimiting the two groups of SAIs, i.e. a symbol which is not used to indicate any SAI.

The list may e.g. be provided as a sai-IntraFreq list and such a list may e.g. be contained in a SIB Type 15, but alternatively, the list may be provided in any format where the mentioned SAIs can be identified as comprising any of the two mentioned groups.

The suggested methods can be applied in a communication network capable of broadcasting via MBMS or eMBMS, or any other network where a SAI list is used.

Figure 6A:
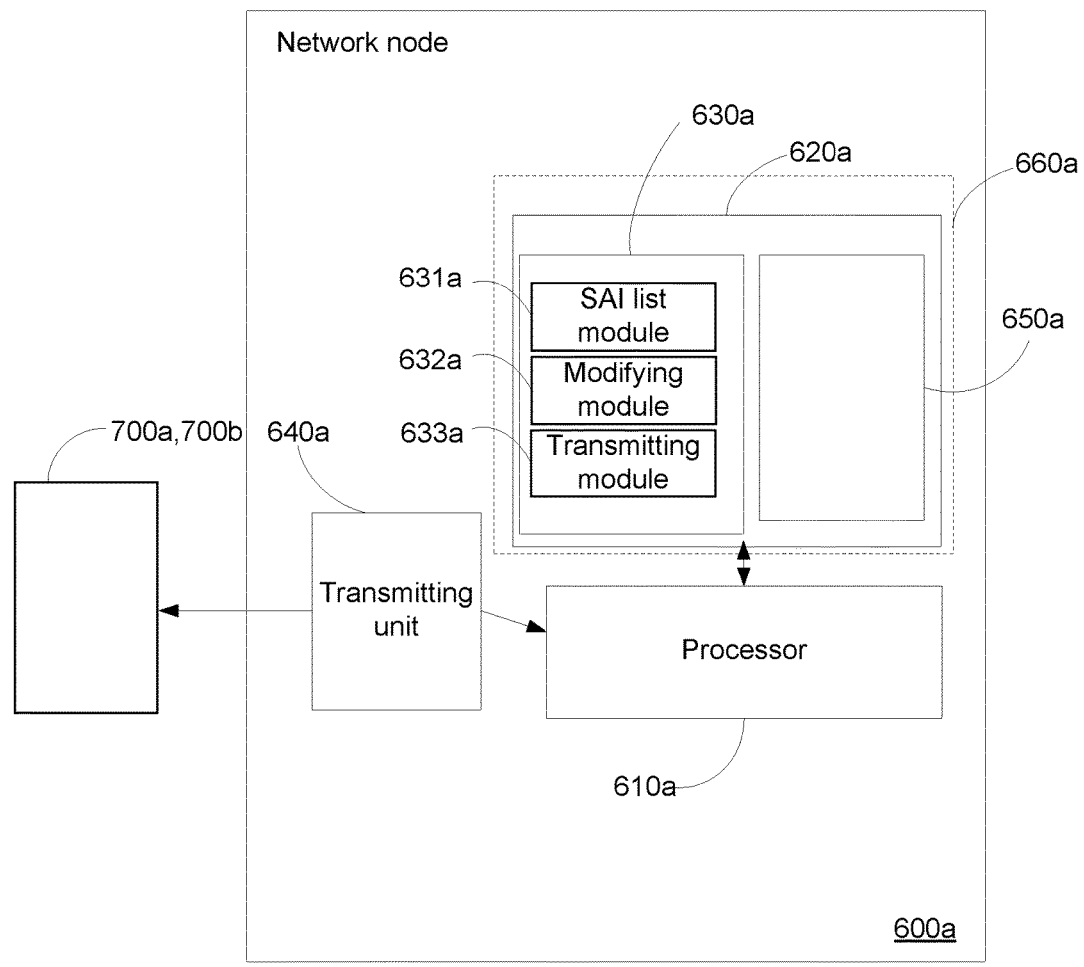
FIG. 6a is an illustration of a network node capable of executing the method as described with reference to FIG. 4, according to a first embodiment.
Figure 6B:
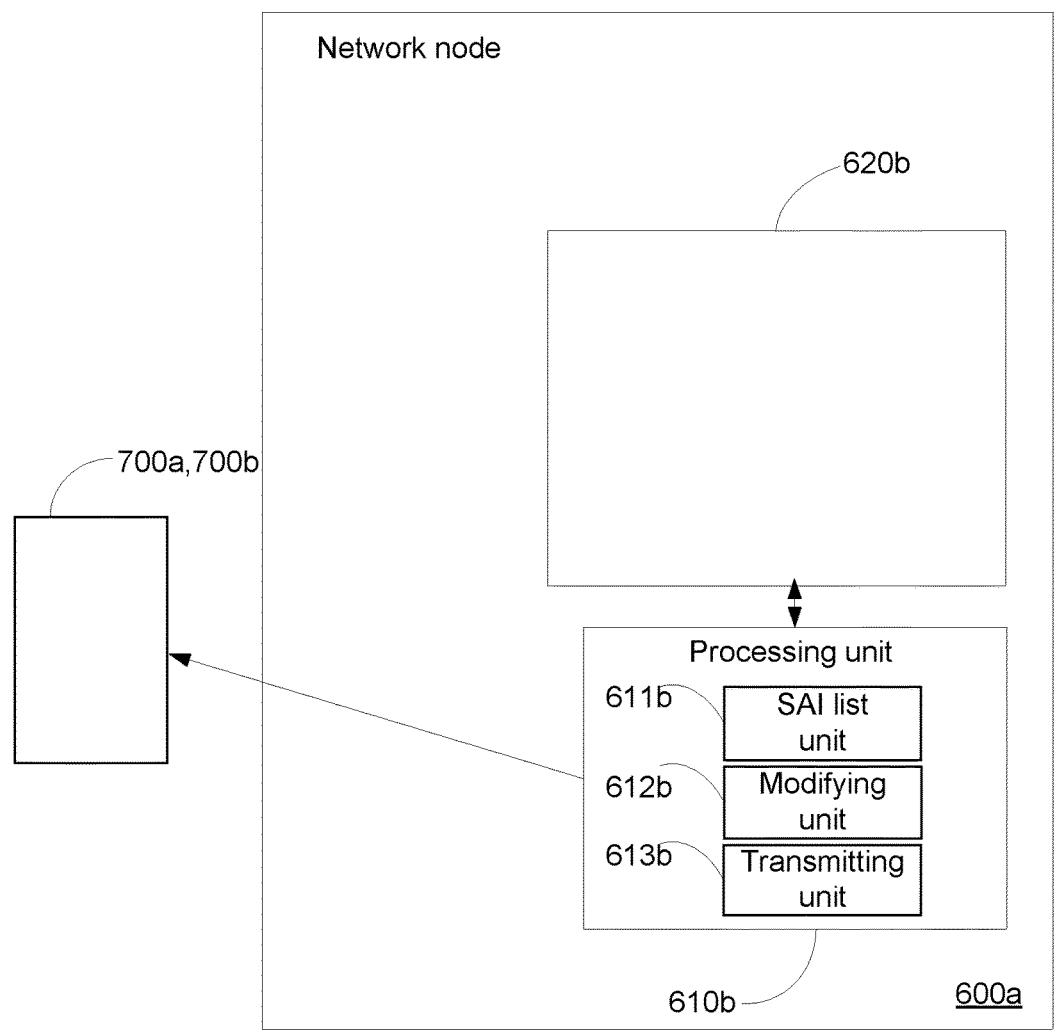
FIG. 6b is an illustration of a network node capable of executing the method as described with reference to FIG. 4, according to a second embodiment.

A network node capable of modifying a SAI list as suggested above according to one embodiment is described in FIG. 6a, where the network node 600a comprise one or more processors, here illustrated by processor 610a and a memory 620a, which is configured to store computer readable instructions 630a, or program code, which when executed by the processor 610a causes the network node 600a to execute the method steps according to the method described above with reference to FIG. 4. The processor 610a may be a single CPU (Central processing unit), but could alternatively comprise two or more processing units.

According to one embodiment, the network node 600a comprises computer readable instructions which when executed by the processor causes the network node to:

acquire a list of SAIs indicative of Service Areas capable of providing the broadcasted service, the list comprising at least one current SAI and at least one neighboring SAI; modify the list by grouping the SAIs, such that the current SAIs are made distinguishable from the neighboring SAIs by a UE, and transmit the modified list to the UE. As indicated in FIG. 600a, the suggested method may be executed by one or more mutually interacting modules, each comprising computer readable instructions or computer program code. In the embodiment of FIG. 6a the acquiring step is executed by a module referred to as a SAI list module 631a, while another module, here referred to as a modifying module 632a, is configured to execute appropriate modification of the acquired SAI list, by arranging the SAIs of the list such that the two different group of SAIs as described herein can be distinguished from each other. As already mentioned above this may be achieved by generating and adding a delimiter symbol in a location of the list such that the two groups of SAIs are distinguishable from each other. Once the list has been modified accordingly, yet another module, here referred to as a transmitting module 633a, is configured to transmit the SAI list in a conventional manner via a transmitting unit 640a to a UE 700a, 700b.

The memory 620a also comprises persistent storage 650a, which, for example, can be any single one or combination of magnetic memory, optical memory, solid state memory or even remotely mounted memory, capable e.g. of storing monitored data, data usage patterns, predefined rules etc.

According to an alternative embodiment, a network node 600b, may instead comprise one or more processing unit, here represented by processing unit 610b. The processor 610b may e.g. include one or more general purpose microprocessors, microprocessors, such as e.g. one or more ASICs (Application Specific Integrated Circuit) or, Digital Signal Processors (DSP), wherein different mutually interacting units are configured to execute a method for modifying a SAI list as suggested above with reference to FIG. 4.

Accordingly, a unit, here referred to as a SAI list unit 611b, may be configured to acquire a SAI List, while another unit, here referred to as a modifying unit 612b, is configured to make relevant modification of the list, and yet another unit, here referred to as a transmitting unit 613b, is configured to transmit the modified list, via suitable transmitting functionality (not shown). In the examples given above, the network node 600a, 600b, is an eNB, but alternatively, the network node may be any type of access node, capable of handling a SAI list as described herein.

Figure 7A:
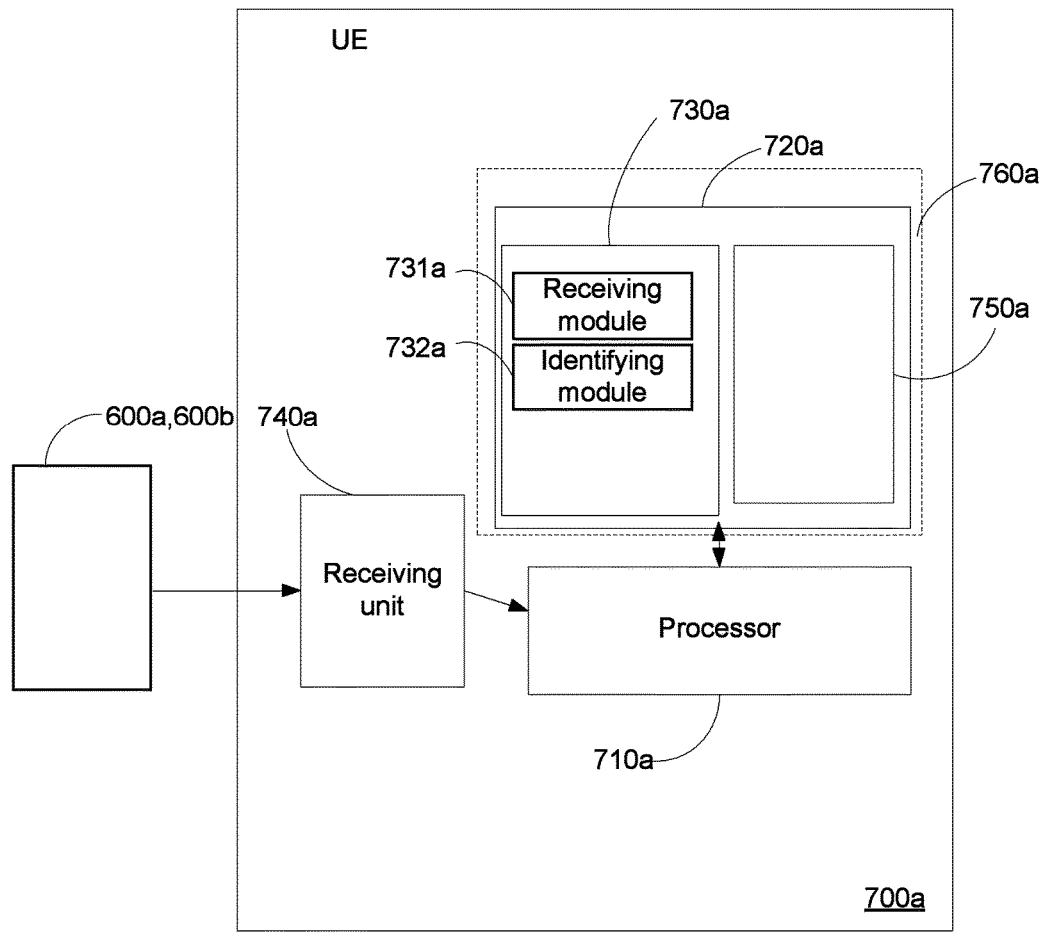
FIG. 7a is an illustration of a UE capable of executing the method as described with reference to FIG. 5, according to a first embodiment.
Figure 7B:
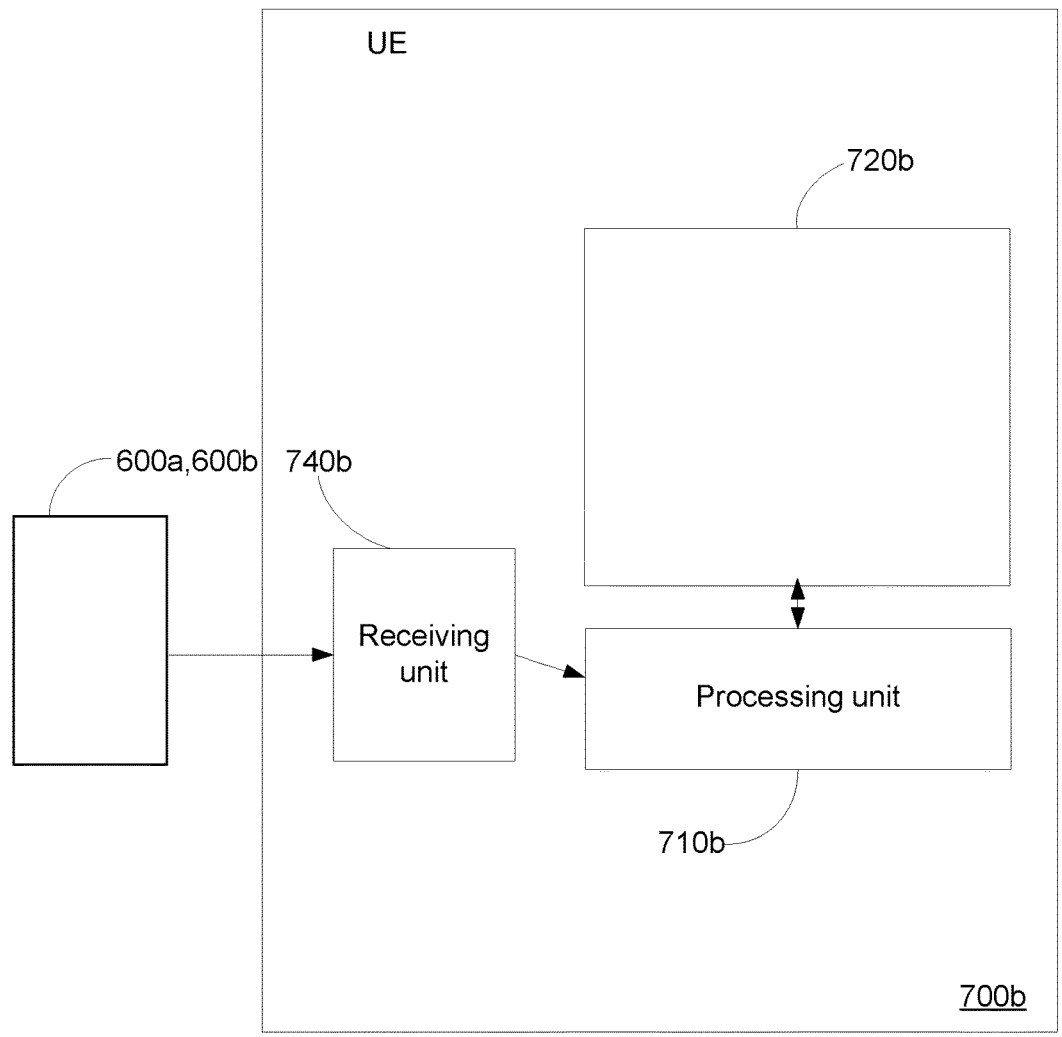
FIG. 7b is an illustration of a UE capable of executing the method as described with reference to FIG. 5, according to a second embodiment.

A UE, which may be any type of portable or stationary device, capable of identifying a modified SAI list as suggested above is described in FIG. 7a, where the UE 700a comprise one or more processors, here illustrated by processor 710a and a memory 720a, which is configured to store computer readable instructions 730a, or computer program code, constituting a computer program, which when executed by the processor 710a causes the UE 700a to execute the method steps according to any of the methods described above.

The processor 710a may be a single CPU (Central processing unit), but could alternatively comprise two or more processing units.

According to one embodiment, the UE 700a comprises computer readable instructions which when executed by the processor causes the network node to: receive a list of SAIs, indicative of Service Areas capable of providing the broadcasted service, the list comprising at least one current SAI and at least one neighboring SAI; identify a symbol other than the symbols, representing a current SAI or a neighboring SAI, as a delimiter symbol, and distinguish, based on the delimiter symbol, the at least one current SAI from the at least one neighboring SAI. As already mentioned above, the delimiter symbol may be arranged in different ways, as long as the UE is made aware of how to interpret the applied delimiter symbol. As indicated in FIG. 7a, the method as described above with reference to FIG. 5 may be executed by specific, mutually interacting, modules. In the present embodiment the acquiring step is executed by a module referred to as a receiving module 731a, configured to receive a SAI list via a receiving unit 740a, while another module, here referred to as a identifying module 732a, is configured to recognize the delimiter symbol and to distinguish the two groups of SAIs based on the delimiter symbol. Once distinguished, the UE may use the provided information in any suitable way.

The memory 720a also comprises persistent storage 750a, which, for example, can be any single one or combination of magnetic memory, optical memory, solid state memory or even remotely mounted memory, capable e.g. of storing monitored data, data usage patterns, predefined rules etc.

The computer programs 630a, and 730a may be carried by a computer program product 660a, 760a, respectively. The computer program product may comprise a computer readable medium on which the computer program is stored. For example, the computer program product may be a flash memory, a RAM (Random-access memory) ROM (Read-Only Memory) or an EEPROM.

According to an alternative embodiment, a UE 600b, may instead comprise one or more processing unit, here represented by processing unit 710b. For example, the processor 710b may include one or more general purpose microprocessors, microprocessors, such as e.g. one or more ASICs (Application Specific Integrated Circuit) or, Digital Signal Processors (DSP), wherein different interacting units are configured to execute a method for modifying a SAI list as suggested above. Accordingly, the processing unit 710b is configured to identify reception of a SAI List received via a receiving unit 740b, and to proceed by identifying a delimiter symbol in the list and distinguishing the two groups of SAIs based on the delimiter symbol. The latter functionality may e.g. be provided by an identifying unit.

It is to be understood that even though the given examples refer to eMBMS the described solution is applicable also in MBMS enabled systems, as well as to any type of communication systems where a SAI list, or a corresponding list, is used. It is also to be understood that the units and modules mentioned above are only describing alternative embodiments and that the network node and UE described above may comprise other interacting units, modules, or a combination thereof, as long as the functionality described above can be obtained. Furthermore, it is to be understood that a network node, as well as a UE which are capable of operating in the context described above will be capable of performing additional functionality than what has been described here, such that e.g. providing two-way communication. However, units and modules which are normally used in the described context, but which are not necessary for understanding the mechanisms as described above have been omitted for simplicity reasons.

The invention claimed is:

1. A method executed in a network node of a communication network capable of transmitting a broadcasted service to user equipments, comprising:
   acquiring a list of Service Area Identities (SAIs), indicative of service areas capable of providing the broadcasted service to the user equipments, the list comprising at least one SAI that is currently broadcasted in a current cell and at least one SAI that is currently broadcasted in at least one neighboring cell with the same frequency as in the current cell;

modifying the list by grouping the SAIs, such that the at least one SAI currently broadcasted in a current cell is distinguishable from the at least one SAI, currently broadcasted in at least one neighboring cells with the same frequency as in the current cell, and by adding a delimiter symbol to the list, the delimiter symbol separating the at least one SAI currently broadcasted in the current cell from the at least one SAI currently broadcasted in the neighboring cell, wherein the delimiter symbol is distinguishable from the SAIs of the list and is generated by any of:

duplicating a value of at least the last SAI of the at least one SAI currently broadcasted in the current cell, and placing the duplicated value next to a value that has been duplicated of the last SAI of the at least one SAI currently broadcasted in the current cell, or applying a predefined symbol after the last SAI of the at least one SAI currently broadcasted in the current cell and before a first SAI of the at least one SAI currently broadcasted in the neighboring cell, the predefined symbol used in the list only for the purpose of indicating separation of the at least one SAI currently broadcasted in the current cell and the at least one SAI currently broadcasted in the neighboring cell, and transmitting the modified list to the user equipments.

2. The method according to claim 1, wherein the list is contained in a System Information Block (SIB) Type 15.

3. A network node of a communication network capable of transmitting a broadcasted service to user equipments, comprising:

a processor, and a memory storing instructions which, when executed by the processor cause the network node to:

acquire a list of Service Area Identities (SAIs), indicative of service areas capable of providing the broadcasted service to the user equipments, the list comprising at least one SAI that is currently broadcasted in a current cell and at least one SAI that is currently broadcasted in at least one neighboring cell with the same frequency as in the current cell;

modify the list by grouping the SAIs, such that the at least one SAI currently broadcasted in a current cell is distinguishable from the at least one SAI, currently broadcasted in at least one neighboring cell with the same frequency as in the current cell, and by adding a delimiter symbol to the list, the delimiter symbol separating the at least one SAI currently broadcasted in the current cell from the at least one SAI currently broadcasted in the neighboring cell and being distinguishable from the SAIs of the list, the delimiter symbol being generated by any of: duplicating a value of at least the last SAI of the at least one SAI currently broadcasted in the current cell, and placing the duplicated value next to a value that has been duplicated of the last SAI of the at least one SAI currently broadcasted in the current cell, or applying a predefined symbol after the last SAI of the at least one SAI currently broadcasted in the current cell and before a first SAI of the at least one SAI currently broadcasted in the neighboring cell, the predefined symbol used in the list only for indicating separation of the at least one SAI currently broadcasted in the current cell and the at least one SAI currently broadcasted in the neighboring cell; and transmit the modified list to the user equipments.

4. The network node according to claim 3, wherein the network node is an access node of the communication network.

5. The network node according to claim 4, wherein the network node is an eNodeB.

6. A computer program product comprising a non-transitory computer readable storage medium storing computer program executable on a network node capable of transmitting a broadcasted service to user equipments, the computer program comprising computer program code which, when run on the network node causes the network node to:

acquire a list of Service Area Identities (SAIs), indicative of service areas capable of providing the broadcasted service to the user equipments, the list comprising at least one SAI that is currently broadcasted in a current cell and at least one SAI that is currently broadcasted in at least one neighboring cell with the same frequency as in the current cell;

modify the list by grouping the SAIs, such that the at least one SAI currently broadcasted in a current cell is distinguishable from the at least one SAI currently broadcasted in at least one neighboring cell, and by adding a delimiter symbol to the list, the delimiter symbol separating the at least one SAI currently broadcasted in a current cell from the at least one SAI currently broadcasted in a neighboring cell and being distinguishable from the SAIs of the list, the delimited symbol generated by any of:

duplicating a value of at least the last SAI of the at least one SAI currently broadcasted in the current cell, and placing the duplicated value next to a value that has been duplicated of the last SAI of the at least one SAI currently broadcasted in the current cell, or applying a predefined symbol after the last SAI of the at least one SAI currently broadcasted in the current cell and before a first SAI of the at least one SAI currently broadcasted in the neighboring cell, the predefined symbol used in the list only for the purpose of indicating separation of the at least one SAI currently broadcasted in the current cell and the at least one SAI currently broadcasted in the neighboring cell, and transmit the modified list to the user equipments.

7. A method executed in a user equipment capable of receiving a broadcasted service from a communication system, comprising:

receiving a list of Service Area Identities (SAIs) from a network node, the list being indicative of service areas capable of providing the broadcasted service to the user equipment, the list comprising at least one SAI that is currently broadcasted in a current cell and at least one SAI that is currently broadcasted in at least one neighboring cell with the same frequency as in the current cell;

identifying, in the list, the SAIs as arranged into two distinguishable groups, wherein a first group comprise the at least one SAI currently broadcasted in a current cell and a second group comprise the at least one SAI currently broadcasted in at least one neighboring cell with the same frequency as in the current cell, and distinguishing, based on the arrangement of the list, SAIs currently broadcasted in a current cell from neighboring SAIs currently broadcasted in neighboring cells by recognizing in the list, a delimiter symbol, the delimiter symbol separating the at least one SAI currently broadcasted in the current cell from the at least one SAI currently broadcasted in the neighboring cell and being distinguishable from the SAIs of the list, the delimiter symbol being any of:
  a duplicated value of at least a last SAI of the at least one SAI currently broadcasted in the current cell, the duplicated value placed next to a value of the last SAI that has been duplicated or
  a predefined symbol placed after the last SAI of the at least one SAI currently broadcasted in the current cell and before a first SAI of the at least one SAI currently broadcasted in the neighboring cell, the predefined symbol used in the list only for the purpose of indicating separation of the at least one SAI currently broadcasted in the current cell and the at least one SAI currently broadcasted in the neighboring cell.

8. A user equipment capable of receiving a broadcasted service from a communication system, comprising:
  a processor, and
  a memory storing instructions which, when executed by the processor cause the user equipment to:
    receive a list of Service Area Identities (SAIs) from a network node, the list being indicative of service areas capable of providing the broadcasted service to the user equipment, the list comprising at least one SAI currently broadcasted in a current cell and at least one SAI broadcasted in at least one neighboring cell with the same frequency as in the current cell;
    identify, in the list, the SAIs as arranged into two distinguishable groups, wherein a first group comprise the at least one SAI currently broadcasted in a current cell and a second group comprise the at least one SAI currently broadcasted in at least one neighboring cell with the same frequency as in the current cell, and
    distinguish, based on the arrangement of the list, SAIs currently broadcasted in a current cell from SAIs currently broadcasted in neighboring cells by recognizing, in the list, a delimiter symbol, the delimiter symbol separating the at least one SAI currently broadcasted in the current cell from the at least one SAI currently broadcasted in the neighboring cell and being distinguishable from the SAIs of the list, the delimited symbol being any of:
      a duplicated value of at least a last SAI of the at least one SAI currently broadcasted in the current cell, the duplicated value placed next to a value of the last SAI that has been duplicated or
      a predefined symbol placed after the last SAI of the at least one SAI currently broadcasted in the current cell and before a first SAI of the at least one SAI currently broadcasted in the neighboring cell, the predefined symbol used in the list only for the purpose of indicating separation of the at least one SAI currently broadcasted in the current cell and the at least one SAI currently broadcasted in the neighboring cell.

9. A computer program product comprising a non-transitory computer readable storage medium storing a computer program executable on a user equipment capable of receiving a broadcasted service from a communication system, the computer program comprising computer program code which, when run on the user equipment causes the user equipment to:
  receive a list of Service Area Identities (SAIs) from a network node, the list being indicative of service areas capable of providing the broadcasted service to the user equipment, the list comprising at least one SAI that is currently broadcasted in a current cell and at least one SAI that is currently broadcasted in at least one neighboring cell with the same frequency as in the current cell;
  identify, in the list, the SAIs as arranged into two distinguishable groups, wherein a first group comprise the at least one SAI currently broadcasted in a current cell and a second group comprise the at least one SAI currently broadcasted in at least one neighboring cell with the same frequency as in the current cell, and
  distinguish, based on the arrangement of the list, SAIs currently broadcasted in a current cell from SAIs currently broadcasted in at least one neighboring cell by recognizing, in the list, a delimiter symbol, the delimiter symbol separating the at least one SAI currently broadcasted in the current cell from the at least one SAI currently broadcasted in the neighboring cell and being distinguishable from the SAIs of the list, the delimiter symbol being any of:
    a duplicated value of at least a last SAI of the at least one SAI currently broadcasted in the current cell, the duplicated value placed next to a value of the last SAI that has been duplicated or
    a predefined symbol placed after the last SAI of the at least one SAI currently broadcasted in the current cell and before a first SAI of the at least one SAI currently broadcasted in the neighboring cell, the predefined symbol used in the list only for the purpose of indicating separation of the at least one SAI currently broadcasted in the current cell and the at least one SAI currently broadcasted in the neighboring cell.

* * * * *